July 17, 1951     J. R. PIERCE     2,560,818
VISIBLE INDICATOR FOR RADIO OBJECT LOCATORS
Filed Dec. 29, 1948     2 Sheets-Sheet 1
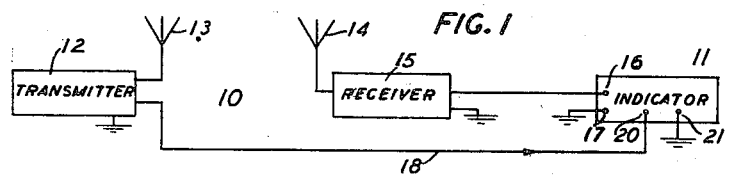
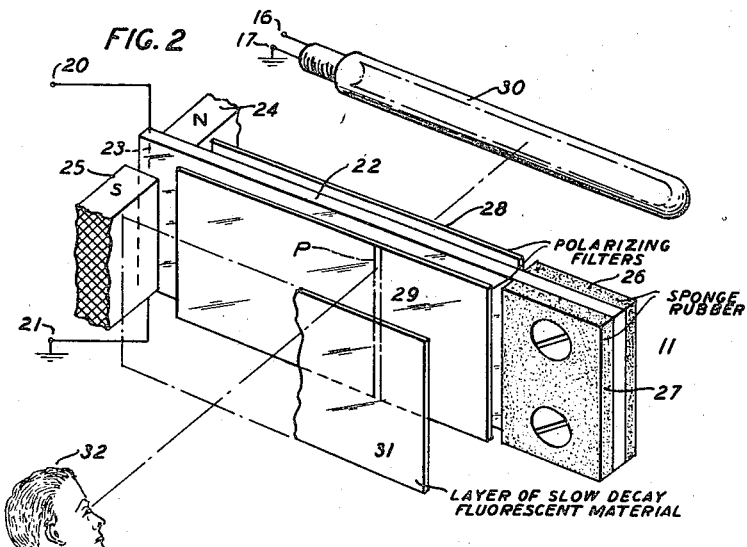
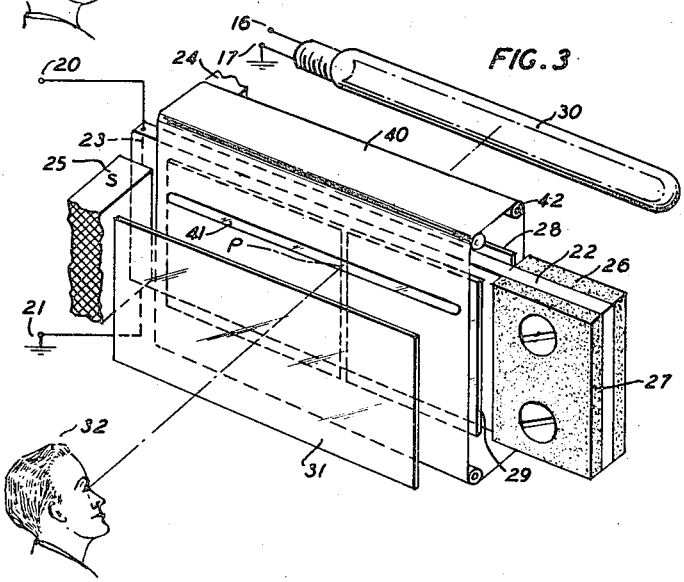
INVENTOR
J. R. PIERCE
BY
Hugh S. Wertz
ATTORNEY July 17, 1951     J. R. PIERCE     2,560,818
VISIBLE INDICATOR FOR RADIO OBJECT LOCATORS
Filed Dec. 29, 1948     2 Sheets-Sheet 2
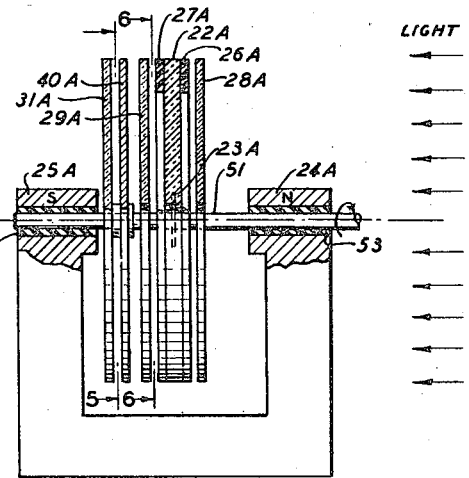
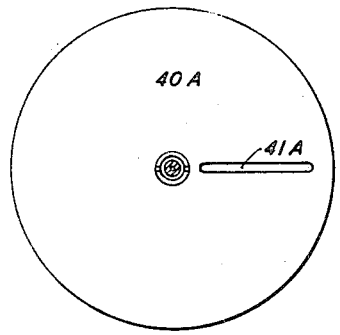
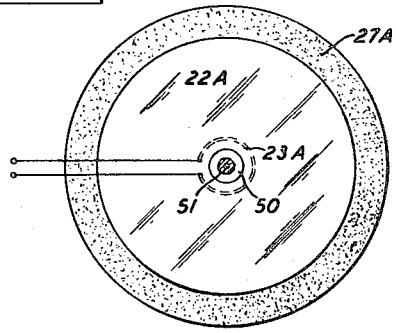
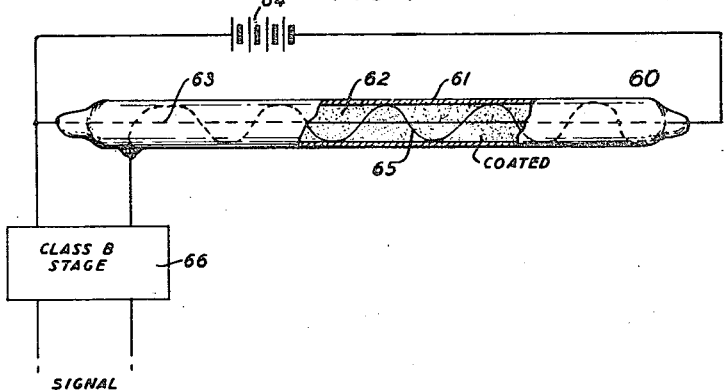
INVENTOR
J. R. PIERCE
BY
Hugh S. Wertz
ATTORNEY Patented July 17, 1951

2,560,818

UNITED STATES PATENT OFFICE 2,560,818

VISIBLE INDICATOR FOR RADIO OBJECT LOCATORS

John R. Pierce, Millburn, N. J., assignor to Bell Telephone Laboratories, Incorporated, New York, N. Y., a corporation of New York Application December 29, 1948, Serial No. 68,020

3 Claims. (Cl. 343—11)

This invention relates to visible indicators and more specifically to indicator means for radars.

It is an object of this invention to simplify radar indicators.

It is another object of this invention to make unnecessary the usual high voltages required in the apparatus for the indication of radar echoes.

The use of a cathode ray tube as an indicator in radar systems is awkward in several respects. First, the tube depth is great compared with the screen size. Secondly, a high voltage supply is necessary to properly accelerate the beam in the cathode ray tube. Moreover, cathode ray tubes are relatively difficult to manufacture. The present invention in its primary aspect relates to an indicator for radar signals which is subject to none of these disadvantages.

In accordance with the invention, there is provided, by way of example, a device which depends for its operation on the visibility of strains in transparent substances under polarized light. The radar outgoing pulse is used to set up in the transparent medium a mechanical stress wave which travels down its length. The echo pulse is caused to flash a light source briefly and the distance between the origin of the stress wave and the observed position thereof on the medium is a measure of the time between the transmitted pulse and its echo, and hence of the range of the target producing the echo. A fluorescent screen can be utilized to give a persistent echo marker. The presentation of the radar signal can be either in rectilinear or polar coordinates.

The invention will be more readily understood by referring to the following description taken in connection with the accompanying drawings forming a part thereof in which:

Fig. 1 is a schematic block diagram of a simple radar system employing an indicator in accordance with the invention;

Fig. 2 is a perspective view of an indicator in accordance with the invention;

Fig. 3 is a perspective view of a modification of the indicator of Fig. 2 which is adapted to have a two-dimensional presentation;

Fig. 4 is a side view of an indicator in accordance with the invention which makes a presentation in polar coordinates;

Figs. 5 and 6 are front views of the arrangement of Fig. 4 with the portions in front of the planes through line 5—5 and line 6—6, respectively, of Fig. 4 being broken away, the views being taken in the directions of the arrows; and Fig. 7 shows a light source suitable for the indicating means of Figs. 2, 3 and 4.

Referring more particularly to the drawings, Fig. 1 shows, by way of example and in block diagram form, a simplified radar system 10 utilizing an indicator 11 in accordance with the invention. The radar system comprises a transmitter 12 of any suitable type for producing an ultra-high frequency, pulse-modulated wave. The transmitter 12 can comprise an oscillator for providing a sine wave having a suitable periodicity which can conveniently be 480 cycles per second but which may be as high as 4000 cycles per second, if desired. The oscillator energizes a pulse generator of any of several suitable types well-known in the art. For example, see United States Patent 2,117,752, issued May 17, 1938, to L. R. Wrathall, which provides an energy impulse at a particular point of each cycle of the input wave supplied to it. The pulses from the pulse generator are then applied to a carrier generator and modulator of any suitable type which may, for example, generate a carrier wave of several thousand megacycles per second and this carrier wave is modulated by the pulses from the pulse generator. The modulated wave is applied to the transmitting antenna 13.

Waves reflected from one or more objects within the range of the transmitting antenna 13 are received by the receiving antenna 14. The antennas 13 and 14 can be of any suitable type. Connections to the transmitting antenna 13 and from the receiving antenna 14 are made by coaxial cables or by wave guides.

The echoes or reflected waves (the direct reception of the transmitted waves is blocked by any well-known means) picked up by the receiving antenna 14 are applied to a receiver 15 of any suitable form wherein they are detected and amplified and applied to the terminals 16 and 17 of the indicator 11 which may be of the form shown in Fig. 2, for example. One of the terminals, such as the terminal 17, can be grounded. Pulses from the transmitter 12 are applied by means of connection 18 directly to terminal 20 of the indicator 11 and the other input terminal 21 of the indicator for these pulses can be grounded.

Referring now to Fig. 2, which shows an exemplary embodiment of an indicator in accordance with the invention, the reference character 22 is used to designate a strip of transparent material such as glass or plastic in one end of which is embedded a wire 23 which is connected to the input terminals 20 and 21 which receive the transmitted pulses. About the wire 23 is caused to exist a magnetic field which can be produced by any suitable means, such as by the pole-pieces 24 and 25, for example. By passing a short current pulse (such as one of the pulses from the transmitter 12, for example) through the wire 23, a mechanical wave is initiated which travels to the right in the arrangement of Fig. 2. The other end of the strip 22 is clamped in sponge rubber pads 26 and 27 or otherwise terminated so that the wave is absorbed and not reflected. By means of two sheets 28 and 29 of polarizing material and a suitable light source 30 arranged as shown in Fig. 2 (for simplicity in the drawings the optical system has not been shown), the position of the wave (say at P, for example) can be made visible as a streak of illumination. Thus, assuming a pulse is applied by means of the connection 18 and terminals 20 and 21 at the time of transmission and the light source 30 is flashed on briefly by the returning echo applied to it by the terminals 16 and 17 connected to the final amplifier in the receiver 15, then the distance between the wire 23 and the observed position of the wave at P is a measure of time between transmission and echo, and hence of the range of the object producing the echo.

In order to obtain an effect similar to that for a long persistence cathode ray screen, a layer 31 of slow decay fluorescent material can be placed between the polarizing strip 29 and the observer 32, so that the flash from source 30 causes a persistent glow at the position P of the wave.

Two dimensional presentations can be achieved by the arrangement shown in Fig. 3. In this figure, elements similar to corresponding elements in the arrangement of Fig. 2 have been given similar reference characters. In the arrangement of Fig. 3, a belt 40 having a horizontal slit 41 therein is moved vertically at a rate which is low compared with the pulse repetition rate. The vertical position of the slit 41 can, for instance, correspond to altitude while distance along the strip corresponds to range. The belt 40 can be moved manually or by any suitable motor means (not shown). It has been shown as an endless belt moving over rollers 42 but it may take the form of a shutter having a reciprocating movement (up and down).

Figs. 4 to 6, inclusive, show an indicator in accordance with the invention which makes a presentation in polar coordinates. In this arrangement, the strip 22 of the indicator of Fig. 3 has been replaced by a disc 22A mounted around shaft 51 and the wire 23A, instead of being vertical as is the wire 23 in Fig. 3, is positioned in almost a complete circle near a central hole 50 in the disc 22A. The periphery of the disc is held between sponge rubber clamps 26A and 27A, respectively. Elements 28A, 29A, 31A and 40A correspond respectively to elements 28, 29, 31 and 40 of Fig. 3 except that they are all in the form of discs, all except the member 40A being mounted around the rotating shaft 51 and the member 40A being mounted on this shaft which is journalled in insulating bearings 52 and 53 in pole-pieces 24A and 25A. The aperture 41 of Fig. 3 takes the form of a radial slot 41A in the arrangement of Fig. 5. The light source and optical system therefor have not been shown but the center line of the light rays has been indicated. Any suitable optical system which produces parallel rays can be used. (Similarly, the optical systems of Figs. 2 and 3 (which except for the light source 30 have not been shown) produce parallel rays of light.) The thickness of the member 22A can be made a function of radius to achieve any desired relation between elapsed time after the pulse and the radial position of the wave.

From the point of view of light economy, the light source may take the form of a long narrow tube (not shown) moving so as to be always behind the aperture 41A. Alternatively, with a moving light strip source, the member 22A can be made very narrow and it and the polarizing filters 28A and 29A can be moved with the light, thus eliminating the slit 41A entirely.

The light source can be a capillary tube filled with gas at a suitable pressure through which a brief pulse of current is passed at the time of the received echo. Such a current pulse can be derived from a class B or C amplifier stage of very small average dissipation but capable of supplying high peak powers.

Another form of light source 60 is shown in Fig. 7. It comprises a long transparent evacuated envelope 61 coated on the inside with fluorescent material 62. Electron flow exciting fluorescence can take place between a hot filament or cathode 63 (heated by a power source 64) and the loosely coiled wire 65 in contact with the envelope walls. A class B or C stage 66 having little average power consumption but capable of developing a pulse of fairly high voltage and current can be used to excite the tube 60.

Various changes can be made in the embodiments described above without departing from the spirit of the invention, the scope of which is indicated in the claims.

What is claimed is:

1. The combination with a solid transparent material of the type in which stress waves are visible under polarized light, of a light source positioned to throw light on said material, means between said source and said material for polarizing the light from said source, means for periodically setting up a stress wave in one part of said material which travels to other parts thereof, said last-mentioned means comprising a source of ultra-high frequency pulses, means for energizing said light source with echoes of said pulses, and means adjacent said material to make visible portions of said stress wave corresponding to the times of said echoes, said last-mentioned means including a moving screen with an aperture therein.

2. The combination with a solid transparent material of the type in which stress waves are visible under polarized light, of a light source positioned to throw light on said material, means between said source and said material for polarizing the light from said source, means for periodically setting up a stress wave in one part of said material which travels to other parts thereof, said last-mentioned means comprising a source of ultra-high frequency pulses, means for energizing said light source with echoes of said pulse, and means adjacent said material to make visible portions of said stress wave corresponding to the times of said echoes, said last-mentioned means including a moving screen with an aperture therein parallel to the direction of movement of the said stress wave, said screen movement being in a direction perpendicular to said aperture.

3. The combination with a solid transparent material of the type in which stress waves are visible under polarized light, of a light source positioned to throw light on said material, means between said source and said material for polarizing the light from said source, means for periodically setting up a stress wave in one part of said material which travels to other parts thereof, said last-mentioned means comprising a source of ultra-high frequency pulses, means for energizing said light source with echoes of said pulses, and means adjacent said material to make visible portions of said stress wave corresponding to the times of said echoes, said last-mentioned means including a rotating screen with a radial aperture therein.

JOHN R. PIERCE.

REFERENCES CITED

The following references are of record in the file of this patent:

UNITED STATES PATENTS

| Number | Name | Date |
| --- | --- | --- |
| 2,401,094 | Nicholson | May 28, 1946 |
| 2,418,964 | Arenberg | Apr. 15, 1947 |
| 2,521,804 | Roetter | Sept. 12, 1950 |